US009119024B2

(12) United States Patent  
Ando et al.

(10) Patent No.: US 9,119,024 B2  
(45) Date of Patent: Aug. 25, 2015

(54) WIRELESS COMMUNICATION TERMINAL, WIRELESS COMMUNICATION DEVICE, AND WIRELESS COMMUNICATION METHOD

(75) Inventors: Kazuhiro Ando, Kanagawa (JP); Yoshio Urabe, Kanagawa (JP); Masataka Irie, Kanagawa (JP); Hiroshi Takahashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 282 days.

(21) Appl. No.: 13/816,040

(22) PCT Filed: Feb. 9, 2012

(86) PCT No.: PCT/JP2012/000889  
§ 371 (c)(1),  
(2), (4) Date: Feb. 8, 2013

(87) PCT Pub. No.: WO2012/108207  
PCT Pub. Date: Aug. 16, 2012

(65) Prior Publication Data  
US 2013/0143499 A1 Jun. 6, 2013

(30) Foreign Application Priority Data  
Feb. 10, 2011 (JP) ................................ 2011-027720

(51) Int. Cl.  
*H04W 4/00* (2009.01)  
*H04W 4/02* (2009.01)  
(52) U.S. Cl.  
CPC .............. *H04W 4/008* (2013.01); *H04W 4/021* (2013.01); *H04W 4/023* (2013.01)

(58) Field of Classification Search  
CPC .................................................... H04W 4/021  
USPC ...................... 455/41.1, 41.2, 41.3  
See application file for complete search history.

(56) References Cited

U.S. PATENT DOCUMENTS 6,961,541 B2 * 11/2005 Overy et al. ................. 455/41.2  
7,319,845 B2    1/2008 Sugikawa  
7,933,625 B2    4/2011 Sugikawa (Continued)

FOREIGN PATENT DOCUMENTS

| JP | 2003-078478 A | 3/2003 |
| JP | 2004-247794 A | 9/2004 |
| JP | 2005-295286 A | 10/2005 |
| JP | 2009-288874 A | 12/2009 |
| JP | 2010-092208 A | 4/2010 |
| JP | 2010-199752 A | 9/2010 |

OTHER PUBLICATIONS

International Search Report, mailed Mar. 13, 2012, for International Application No. PCT/JP2012/000889, 2 pages.

*Primary Examiner* — Wen Huang  
(74) *Attorney, Agent, or Firm* — Seed IP Law Group PLLC

(57) ABSTRACT

A master device transmits a beacon signal including information related to a proximity wireless communication area in a predetermined cycle by using a transmission power which allows the beacon signal to reach beyond the proximity wireless communication area. When a slave device receives the beacon signal from the master device, the slave device estimates a distance to the master device in accordance with the information of the beacon signal. When a wireless communication terminal is located within the proximity wireless communication area, the slave device is connected to the master device by using a proximity wireless communication.

10 Claims, 10 Drawing Sheets

(56) References Cited

U.S. PATENT DOCUMENTS

| | | |
|---|---|---|
| 2003/0139197 A1* | 7/2003 | Kostic et al. .................. 455/525 |
| 2003/0181215 A1* | 9/2003 | Cromer et al. ................ 455/515 |
| 2004/0157559 A1 | 8/2004 | Sugikawa |
| 2008/0081563 A1 | 4/2008 | Sugikawa |
| 2010/0216507 A1 | 8/2010 | Maeda |
| 2011/0028091 A1* | 2/2011 | Higgins et al. ............... 455/41.2 |
| 2011/0124286 A1* | 5/2011 | Tanaka et al. ................ 455/41.1 |
| 2012/0129454 A1* | 5/2012 | Suzuki et al. ................ 455/41.2 |
| 2012/0135728 A1* | 5/2012 | Karpoor et al. ............ 455/432.1 |

* cited by examiner ized within the claim limit.

WIRELESS COMMUNICATION TERMINAL, WIRELESS COMMUNICATION DEVICE, AND WIRELESS COMMUNICATION METHOD

TECHNICAL FIELD

The present invention relates to a wireless communication terminal, a wireless communication device, and a wireless communication method which can perform a proximity wireless communication between devices near to each other.

BACKGROUND ART

The proximity wireless communication serves to perform a wireless communication in a short distance such as several cm or so. For instance, for an entrance and exit in a wicket of a railway station, a payment in a register of a shop or the like, the proximity wireless communication is employed which uses a non-contact IC card and a reader/writer by, for instance, an NFC (Near Field Communication).

As the wireless communication used for an area wider than that of the proximity wireless communication, there is a short range wireless communication such as a wireless LAN. The short range wireless communication achieves the wireless communication in a short range such as several ten cm to several m or so.

In a communication system using the proximity wireless communication or the short range wireless communication, there is a possibility that a plurality of wireless communication devices (including a communication terminal, an IC card or the like) may coexist in an area of a short range, and it is one problem to prevent a wrong connection and a wrong communication between the devices. As an example of such kind of the communication system, Patent Literature 1 discloses a transmission and reception system which communicates only with near-by slaves among a plurality of slaves located in the periphery of a master in a transmission and reception system using the short range wireless communication including Bluetooth (a registered trademark). Further, Patent Literature 2 discloses a transmission and reception system which prevents a wrong connection and can assuredly communicate with a desired communication party in a short range communication system by a cash register device and a communication terminal including a Bluetooth (the registered trademark) portable terminal that mutually use the short range wireless communication.

In the proximity wireless communication and the short range wireless communication, a high speed transmission is investigated in order to transmit much information in a short time. For instance, in an IEEE 802.11n standard of the wireless LAN, a microwave band including 2.4 GHz and 5 GHz is used and an MIMO (Multiple Input Multiple Output) and a channel bonding are applied, so that a transmission rate is increased to about several hundred Mbps to achieve a high speed transmission.

Further, for the proximity wireless communication including TransferJet (a registered trademark), the proximity wireless communication is investigated in which a microwave band of 4.5 GHz is used and the transmission rate is increased as high as several hundred Mbps or so. Patent Literature 3 discloses a wireless communication device which controls a wireless communication in accordance with a detected result of a magnetic field so that a consumed power may be suppressed in the wireless communication device including a first wireless communication section using a proximity wireless communication meeting a large capacity transmission including the TransferJet (the registered trademark) and a second wireless communication section using the proximity wireless communication including the NFC through the magnetic field.

CITATION LIST

Patent Literature

Patent Literature 1: JP-A-2003-78478
Patent Literature 2: JP-A-2004-247794
Patent Literature 3: JP-A-2010-199752

SUMMARY OF INVENTION

Technical Problem

In the proximity wireless communication, when a communication can be performed in a range exceeding the short distance (the several cm or so), there is a fear that a wrong communication with some other devices than the near-by devices may possibly arise. For instance, when the wicket of the railway station is supposed to be present, an inconvenience arises that an own device communicates with not the wicket that has a reader/writer to which the own device is allowed to come close, but with a reader/writer of a neighboring wicket.

Thus, usually, a transmission power of a beacon transmitted to a slave device from a master device and a transmission power of data transmitted and received between devices are decreased to reduce a range of a radio wave so that a communication distance is limited within a short range. However, when the range of the radio wave is physically limited to limit a communicable area, a problem arises that robustness is deteriorated and there is a fear that a reliability of communication may be possibly deteriorated. Especially, in order to perform a wireless communication system in which the proximity wireless communication is achieved at a higher speed and the transmission rate is increased as high as several Gbps or so, it is an important problem to prevent a wrong communication and ensure a reliability of communication.

The present invention is devised by considering the above-described circumstances and it is an object of the present invention to properly limit a communicable area in a proximity wireless communication and prevent a wrong communication.

Solution to Problem

A wireless communication terminal according to the present invention includes: a beacon receiver which receives a first beacon signal transmitted from a communication party device by a proximity wireless communication, the first beacon signal including information related to a communicable area of the proximity wireless communication; a communicable area deciding section which estimates a distance to the communication party device by using the first beacon signal to decide a position of an own device; and a connection controller which uses a decided result of the communicable area deciding section, and does not connect the own device to the communication party device using the proximity wireless communication when the beacon receiver can receive the first beacon signal, but it is decided that the position of the own device is located outside the communicable area of the proximity wireless communication, and connects the own device to the communication party device using the proximity wireless communication when the beacon receiver can receive the first beacon signal and it is decided that the position of the own device is located inside the communicable area of the proximity wireless communication.

A wireless communication device according to the present invention includes: a beacon generator which generates a first beacon signal including information related to a communicable area of a proximity wireless communication; a beacon transmitter which transmits the first beacon signal in a first cycle by using a transmission power which allows the first beacon signal to reach beyond the communicable area; a signal receiver which receives a proximity wireless communication connection request signal for requesting for a connection of the proximity wireless communication from a communication party terminal which has received the first beacon signal; and a connection controller which uses the proximity wireless communication connection request signal, and does not connect the communication party terminal using the proximity wireless communication to the wireless communication device when the communication party terminal can receive the first beacon signal, but a position of the communication party terminal is located outside the communicable area of the proximity wireless communication, and connects the communication party terminal to the wireless communication device when the communication party terminal can receive the first beacon signal and the position of the communication party terminal is located inside the communicable area of the proximity wireless communication.

A wireless communication method according to the present invention is a wireless communication method in a wireless communication terminal capable of performing a proximity wireless communication, the wireless communication method including: a step of receiving a first beacon signal transmitted from a communication party device by the proximity wireless communication, the first beacon signal including information related to a communicable area of the proximity wireless communication; a step of estimating a distance to the communication party device by using the first beacon signal to decide a position of an own device; and a step of using a decided result of the position of the own device, not connecting the own device to the communication party device using the proximity wireless communication when the own device can receive the first beacon signal, but it is decided that the position of the own device is located outside the communicable area of the proximity wireless communication, and connecting the own device to the communication party device by using the proximity wireless communication when the own device can receive the first beacon signal and it is decided that the position of the own device is located inside the communicable area of the proximity wireless communication.

A wireless communication method according to the present invention is a wireless communication method in a wireless communication device capable of performing a proximity wireless communication, the wireless communication method including: a step of generating a first beacon signal including information related to a communicable area of the proximity wireless communication; a step of transmitting the first beacon signal in a first cycle by using a transmission power which allows the first beacon signal to reach beyond the communicable area; a step of receiving a proximity wireless communication connection request signal for requesting for a connection of the proximity wireless communication from a communication party terminal which has received the beacon signal; and a step of using the proximity wireless communication connection request signal, and not connecting the communication party terminal using the proximity wireless communication to the wireless communication device when the communication party terminal can receive the first beacon signal, but a position of the communication party terminal is located outside the communicable area of the proximity wireless communication, and connecting the communication party terminal to the wireless communication device by using the proximity wireless communication when the communication party terminal can receive the first beacon signal and the position of the communication party terminal is located inside the proximity wireless communication.

Advantageous Effects of Invention

According to the present invention, a communicable area in a proximity wireless communication can be properly limited and a wrong communication can be prevented.

MODES FOR PERFORMING INVENTION

In present embodiments, a wireless communication terminal, a wireless communication device and a wireless communication method are exemplified which are used in a wireless communication system that can perform a proximity wireless communication in a short distance such as several cm or so. Especially, in the present embodiments, a wireless communication device and a wireless communication terminal are further supposed which can achieve a short range wireless communication in a short range such as several ten cm to several m or so as well as the proximity wireless communication, and one examples of structures and operations are shown.

Here, as the proximity wireless communication, a ultra high speed wireless communication system is investigated which has a transmission rate of several Gbps or so exceeding a transmission rate of several hundred Mbps of the Transfer-Jet (the registered trademark) to obtain a higher speed. For instance, in WiGig (a registered trademark) in which a scheme of a specification is developed by WiGig Alliance (Wireless Gigabit Alliance), a transmission rate of 6 Gbps is aimed at by using a milliwave band of 60 GHz.

In the ultra high speed wireless communication system using a frequency band of the milliwave band, when the proximity wireless communication is used, it is important to prevent a wrong communication and ensure a reliability of communication. In the present embodiment, a communicable area in the proximity wireless communication can be properly limited and a wrong communication can be prevented.

First Embodiment

A first embodiment shows a limiting method of the communicable area in the proximity wireless communication and examples of the wireless communication terminal and the wireless communication device using the proximity wireless communication.

In the first embodiment, in order to limit systematically the communicable area, a distance between the devices using the proximity wireless communication is estimated by using signal strength of a reception signal to perform a communication and connection in a proximity wireless communication area (the communicable area). As the wireless communication system, a wireless communication system is supposed to perform a communication by the proximity wireless communication between a master device (a wireless communication device A) as the wireless communication device and a slave device (a wireless communication device B) as the wireless communication terminal. In the present embodiment, in order to discriminate the slave device from the master device, the slave device is explained as the wireless communication terminal and the master device is explained as the wireless communication device.

Figure 1:
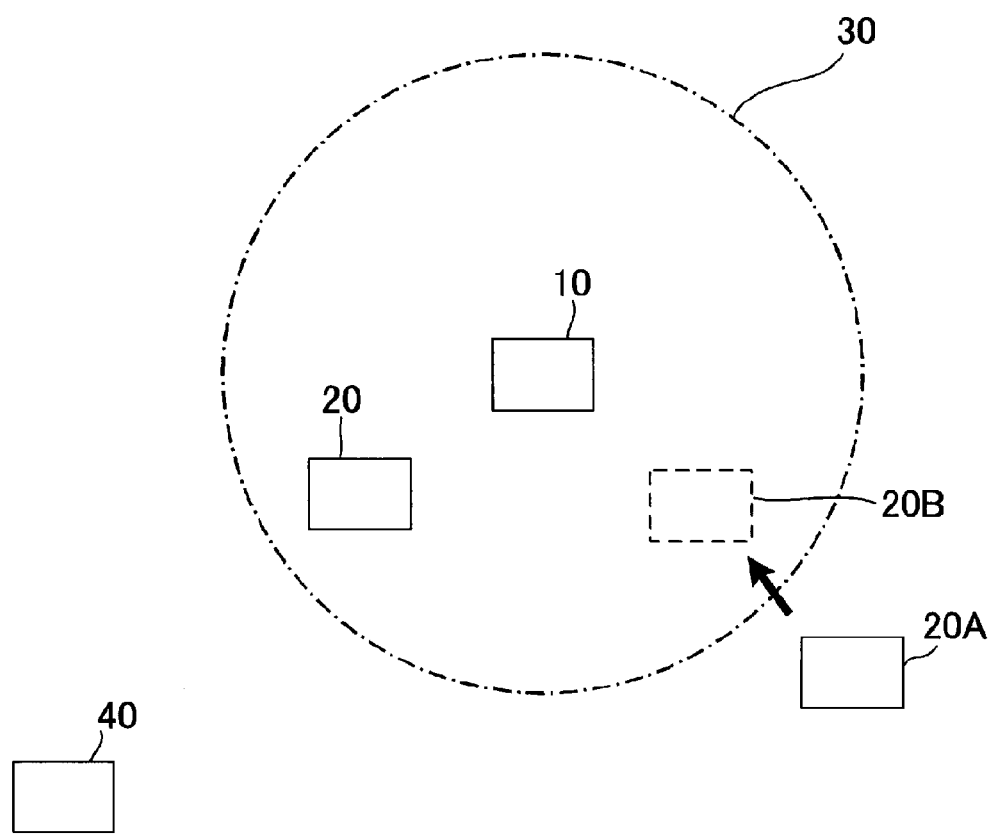
FIG. 1 is a diagram showing a schematic arrangement and structure of a wireless communication system according to a first embodiment of the present invention.

FIG. 1 is a diagram showing a schematic arrangement and structure of the wireless communication system according to the first embodiment. The master device 10 transmits a beacon signal for performing a communication by the proximity wireless communication to a peripheral space. A transmission power of the beacon signal is set so that the beacon signal may reach beyond the proximity wireless communication area 30, and a beacon may be received even outside the proximity wireless communication area.

The slave device 20 which receives the beacon signal from the master device 10 estimates the distance from the master device 10 by using a received signal strength of the beacon signal (or an attenuation quantity of the transmission power). Then, the slave device 20 decides whether or not the distance from the master device 10 is located within the proximity wireless communication area. When the distance from the master device is located within the proximity wireless communication area, the slave device is connected to the master device 10 to transmit and receive data by the proximity wireless communication.

Namely, when the slave device moves from an outside of an area (20A) of the proximity wireless communication area 30 to enter an inside of the area (20B) as in the slave devices 20A and 20B, the slave device is connected to the master device 10 to transmit and receive the data.

On the other hand, a slave device 40 having a long distance hardly receives the beacon signal from the master device 10 or does not communicate with the master device 10 because a distance estimated result indicates an outside of the proximity wireless communication area.

<Structure of Device>

Figure 2:
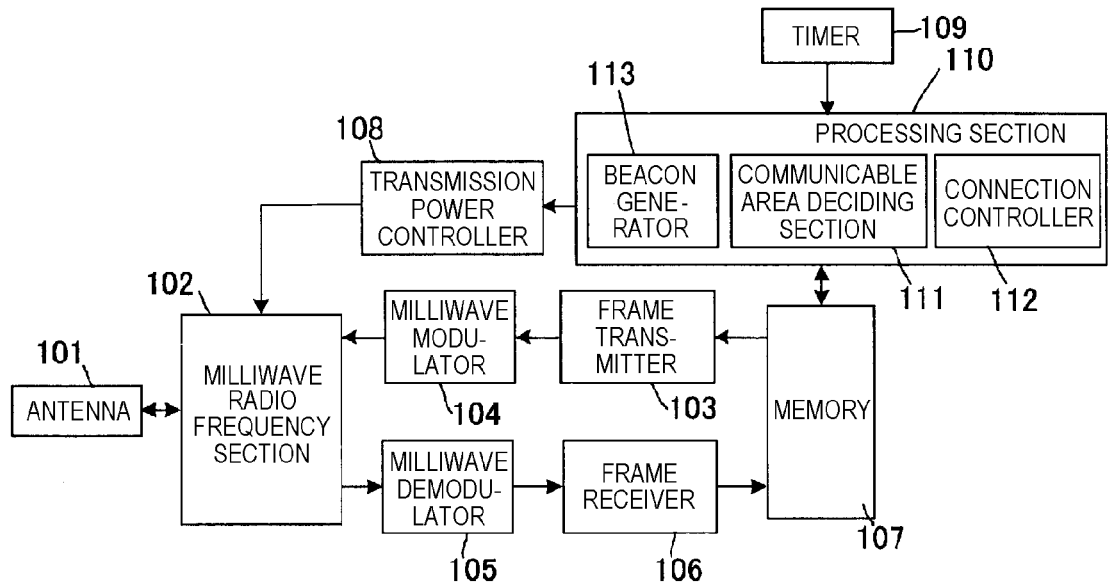
FIG. 2 is a block diagram showing a functional structure of a master device of the present embodiment.

FIG. 2 is a block diagram showing a functional structure of the master device 10 according to the present embodiment.

The master device 10 includes an antenna 101, a milliwave radio frequency section 102, a frame transmitter 103, a milliwave modulator 104, a milliwave demodulator 105, a frame receiver 106, a memory 107, a transmission power controller 108, a timer 109 and a processing section 110.

The milliwave radio frequency section 102 is a front end for a wireless communication of, for instance, a milliwave band of 60 GHz to transmit and receive a radio signal of the milliwave band through the antenna 101. The memory 107 is a storing section for storing transmission data and reception data.

The frame transmitter 103 generates a frame of a transmission signal in accordance with the transmission data outputted from the memory 107. For instance, a transmission frame based on an IEEE 802.11ad is generated.

The milliwave modulator 104 modulates the transmission frame generated in the frame transmitter 103 to perform a modulating process based on, for instance, the IEEE 802.11ad and outputs the modulated transmission signal to the milliwave radio frequency section 102.

The milliwave radio frequency section 102 converts a frequency of the transmission signal, amplifies an electric power and transmits the transmission signal as the radio signal of the milliwave band through the antenna 101. Further, the milliwave radio frequency section 102 receives the radio signal of the milliwave band through the antenna 101, amplifies the signal, converts a frequency and outputs the reception signal to the milliwave demodulator 105.

The milliwave demodulator 105 demodulates the reception signal received in the milliwave radio frequency section 102 to perform a demodulating process based on, for instance, the IEEE 802.11ad and outputs a demodulated reception frame to the frame receiver 106.

The frame receiver 106 analyzes a frame of the reception signal to analyze a reception frame based on, for instance IEEE 802.11ad and inputs and stores reception data of an analyzed result to the memory 107.

The transmission power controller 108 controls a transmission power of the beacon signal for the proximity wireless communication or the short range wireless communication and other transmission signal in accordance with an instruction from the processing section 110.

The processing section 110 includes a microcomputer having a processor and a memory. The processing section 110 executes a predetermined program stored in the memory to process operations respectively in the master device 10. The timer 109 counts a predetermined time and outputs time information for determining a transmission timing of a beacon signal to the processing section 110.

The processing section 110 includes a beacon generator 113, a communicable area deciding section 111 and a connection controller 112. The beacon generator 113 generates a beacon signal for the proximity wireless communication including information related to the communicable area of the proximity wireless communication. Further, when the short range wireless communication is performed, the beacon generator generates a beacon signal for the short range wireless communication including information related to the short range wireless communication. In this case, the processing section 110 outputs the beacon signal in a predetermined cycle so as to correspond to the transmission timing of the beacon signal supplied from the timer 109.

The communicable area deciding section 111 estimates a distance from a communication party terminal and decides whether or not the communication party terminal is located within the communicable area of the proximity wireless communication to output position information of the communication party terminal. The distance to the communication party terminal can be estimated by a method for measuring a reception power (the received signal strength) by the use of the reception signal received in the milliwave radio frequency section 102 and comparing the reception power with a transmission power of the communication party terminal.

When the connection controller 112 receives a connection request signal for the proximity wireless communication for requesting for a connection to the proximity wireless connection from the communication party terminal which receives the beacon signal, the connection controller connects the communication party terminal by using the proximity wireless communication. In this case, even when the communication party terminal can receive the beacon signal, if a position of the communication party terminal is located outside the communicable area of the proximity wireless communication, the connection controller 112 does not connect the communication party terminal using the proximity wireless communication. On the other hand, when the communication party terminal can receive the beacon signal and the position of the communication party terminal is located within the communicable area of the proximity wireless communication, the connection controller 112 connects the communication party terminal by using the proximity wireless communication.

In the above-described structure, the timer 109, the processing section 110, the memory 107, the frame transmitter 103, the milliwave modulator 104, the milliwave radio frequency section 102 and the antenna 101 realize a function of a beacon transmitter. Further, the antenna 101, the milliwave radio frequency section 102, the milliwave demodulator 105, the frame receiver 106, the memory 107 and the processing section 110 realize a function of a signal receiver.

Figure 3:
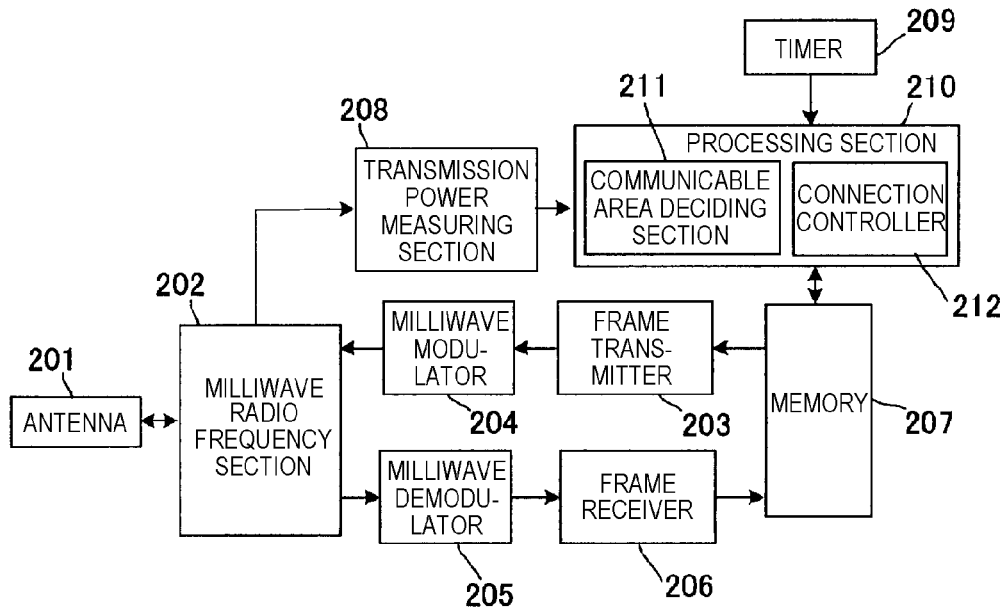
FIG. 3 is a block diagram showing a functional structure of a slave device of the present embodiment.

FIG. 3 is a block diagram showing a functional structure of the slave device 20 according to the present embodiment.

The slave device 20 includes an antenna 201, a milliwave radio frequency section 202, a frame transmitter 203, a milliwave modulator 204, a milliwave demodulator 205, a frame receiver 206, a memory 207, a reception power measuring section 208, a timer 209 and a processing section 210.

The milliwave radio frequency section 202 is a front end for a wireless communication of, for instance, a milliwave band of 60 GHz to transmit and receive a radio signal of the milliwave band through the antenna 201. The memory 207 is a storing section for storing transmission data and reception data.

The frame transmitter 203 generates a frame of a transmission signal in accordance with the transmission data outputted from the memory 207. For instance, a transmission frame based on the IEEE 802.11ad is generated.

The milliwave modulator 204 modulates the transmission frame generated in the frame transmitter 203 to perform a modulating process based on, for instance, the IEEE 802.11ad and outputs the modulated transmission signal to the milliwave radio frequency section 202.

The milliwave radio frequency section 202 converts a frequency of the transmission signal, amplifies an electric power and transmits the transmission signal as the radio signal of the milliwave band through the antenna 201. Further, the milliwave radio frequency section 202 receives the radio signal of the milliwave band through the antenna 201, amplifies the signal, converts a frequency and outputs the reception signal to the milliwave demodulator 205.

The milliwave demodulator 205 demodulates the reception signal received in the milliwave radio frequency section 202 to perform a demodulating process based on, for instance, the IEEE 802.11ad and outputs a demodulated reception frame to the frame receiver 206.

The frame receiver 206 analyzes a frame of the reception signal to analyze the reception frame based on, for instance, IEEE 802.11ad and inputs and stores reception data of an analyzed result to the memory 207.

The reception power measuring section 208 measures a reception power of the beacon signal for the proximity wireless communication received in the milliwave radio frequency section 202 and outputs a measured result to the processing section 210.

The processing section 210 includes a microcomputer having a processor and a memory. The processing section 210 executes a predetermined program stored in the memory to process operations respectively in the slave device 20. The timer 209 counts a predetermined time and outputs time information for determining a reception timing of the beacon signal to the processing section 210.

The processing section 210 includes a communicable area deciding section 211 and a connection controller 212. The communicable area deciding section 211 estimates a distance from a communication party device and decides whether or not a position of an own device is located within the communicable area of the proximity wireless communication. The distance to the communication party device can be estimated by a method for measuring a reception power (the received signal strength) by the use of the beacon signal received in the milliwave radio frequency section 202 and comparing the reception power with a transmission power of the communication party device.

When the connection controller 212 connects the own device to the communication party device by using the proximity wireless communication in accordance with a decided result as to whether the own device is located inside or outside the communicable area of the proximity wireless communication. In this case, even when the own device can receive the beacon signal for the proximity wireless communication, if the position of the own device is located outside the communicable area of the proximity wireless communication, the connection controller 212 does not connect the own device to the communication party device by using the proximity wireless communication. On the other hand, when the own device can receive the beacon signal for the proximity wireless communication and the position of the own device is located within the communicable area of the proximity wireless communication, the connection controller 112 connects the own device to the communication party device by using the proximity wireless communication. Here, the communicable area of the proximity wireless communication is an area narrower than an area where the beacon signal for the proximity wireless communication can be received In the above-described structure, the antenna 201, the milliwave radio frequency section 202, the milliwave demodulator 205, the frame receiver 206, the memory 207 and the processing section 210 realize a function of a beacon signal receiver.

<Operation of Wireless Communication System>

Figure 4:
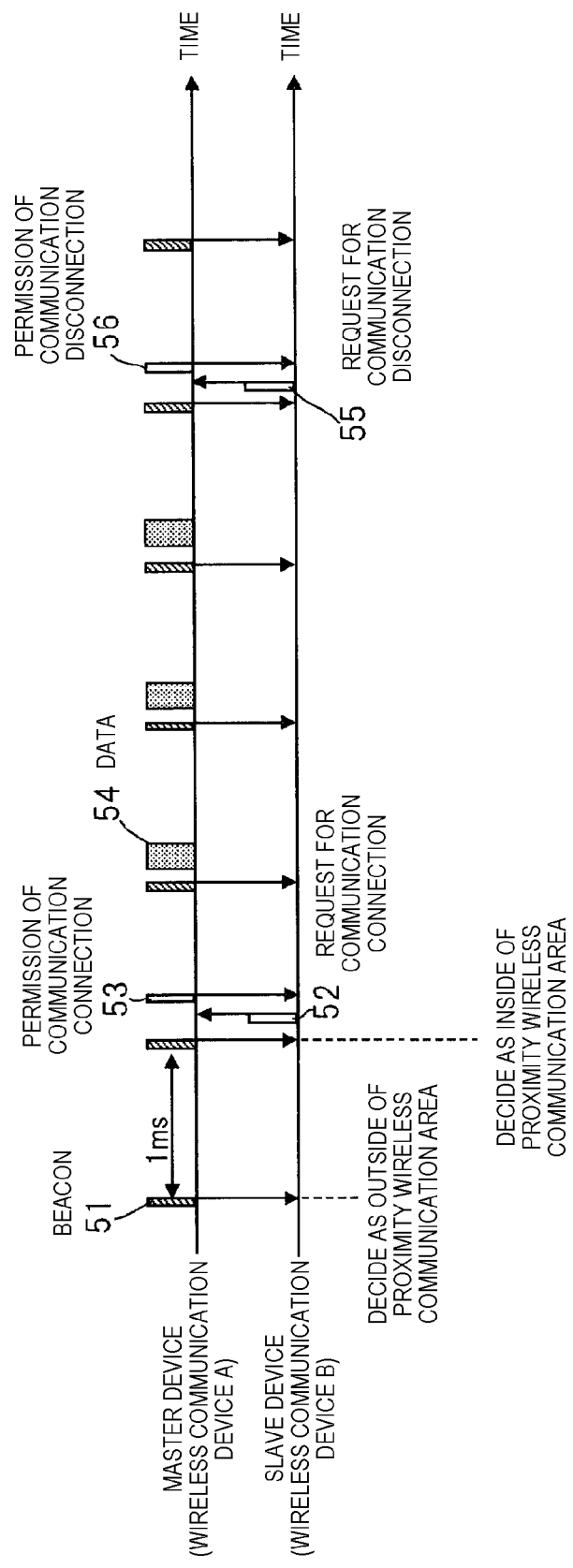
FIG. 4 is an explanatory view of an operation showing operations at the time of starting and finishing a proximity wireless communication in the first embodiment.

Now, operations of the master device 10 and the slave device 20 in the wireless communication system according to the first embodiment will be described below. FIG. 4 is an explanatory view of an operation showing operations at the time of starting and finishing the proximity wireless communication in the first embodiment. In FIG. 4, a horizontal axis indicates a time and shows a signal transmitted and received between the master device 10 and the slave device 20. Here, a communication signal including the beacon signal transmitted and received between the devices is supposed to be transmitted as a packet. Further, FIG. 5 is a sequence diagram showing processes of the master device 10 and the slave device 20 at the time of starting and finishing the proximity wireless communication in the first embodiment.

The master device 10 (the wireless communication device A) periodically transmits the beacon signal 51 for communication by using the proximity wireless communication (S11). The master device 10 transmits the beacon signal 51 at predetermined short cycles (for instance, 1 ms).

Figure 5:
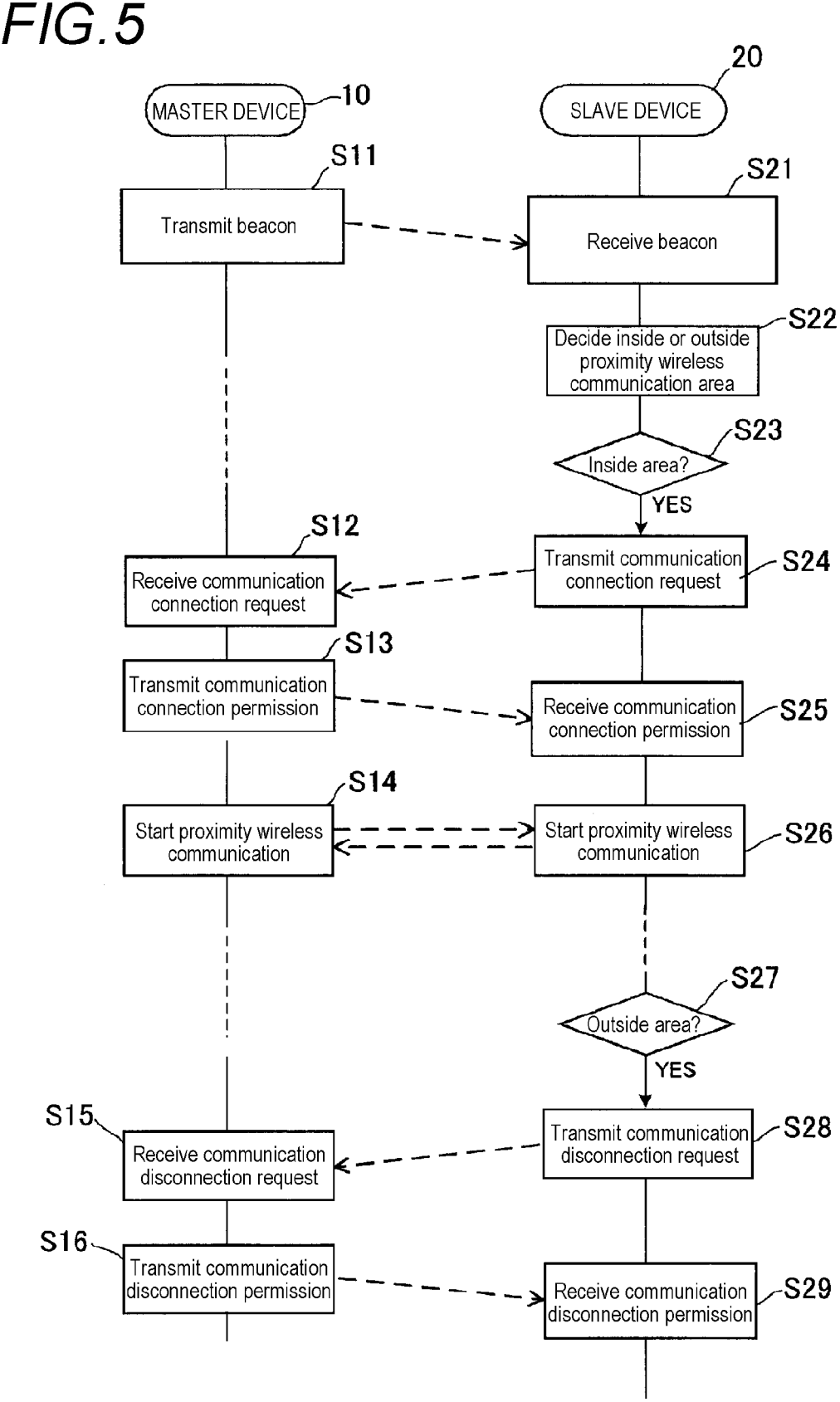
FIG. 5 is a sequence diagram showing processes of the master device and the slave device at the time of starting and finishing the proximity wireless communication in the first embodiment.

Namely, a beacon transmitting process S11 in FIG. 5 is periodically performed. Proximity wireless communication information included in the beacon signal 51 includes at least one or more of identifying information for the proximity wireless communication, transmission power information and communicable area definition information (about several cm). The transmission power information and the communicable area definition information among them are used as information related to the communicable area of the proximity wireless communication. As the communicable area definition information, for instance, dimension information that defines the dimension of the proximity wireless communication area and communication distance upper limit information of the proximity wireless communication or the like may be used. As the communication distance upper limit information of the proximity wireless communication, for instance, a maximum attenuation quantity of the transmission power in the proximity wireless communication area may be employed.

A transmission power of the beacon signal 51 is set substantially to a level in which a range of the beacon signal 51 exceeds the proximity wireless communication area. For instance, the transmission power is set to a relatively small value by considering a consumed power.

As the communicable area definition information (about several cm) of the proximity wireless communication and the transmission power information, values previously set in the wireless communication system may be used. When the previously set values are used, information can be omitted in the beacon signal 51.

When the slave device 20 (the wireless communication device B) receives the beacon signal 51 (S21), the slave device 20 analyzes the proximity wireless communication information included in the beacon signal 51 to measure the received strength of the beacon signal 51. Then, the slave device 20 estimates the distance from the master device 10 as a transmitter of the beacon signal 51 by using the proximity wireless communication information and information of the received signal strength of the beacon signal 51 to decide whether the slave device is located inside or outside the proximity wireless communication area (S22).

When the slave device 20 decides that the slave device 20 is located inside the proximity wireless communication area in a process for deciding whether the slave device 20 is located inside or outside the proximity wireless communication area (S23), the slave device 20 transmits a communication connection request signal 52 to the master device 10 (S24). As connection request information included in the communication connection request signal 52, the identifying information for the proximity wireless communication, the transmission power information or the like is used.

When the master device 10 receives the communication connection request signal 52 from the slave device 20 (S12), the master device 10 analyzes the connection request information included in the communication connection request signal 52 to measure the received strength of the communication connection request signal 52. Then, the master device 10 estimates the distance to the slave device 20 as a transmitter of the communication connection request signal 52 by using the connection request information and information of the received signal strength of the communication connection request signal 52 to decide whether or not the slave device is located inside or outside the proximity wireless communication area.

When the master device 10 decides that the slave device 20 is located within the proximity wireless communication area, the master device 10 transmits a communication connection permission signal 53 to the slave device (S13). When the master device 10 estimates the distance to the slave device 20 and the slave device 20 is located within the proximity wireless communication area, the master device 10 may transmit the communication connection permission signal 53, or the master device 10 may omit a deciding process in the proximity wireless communication area to transmit the communication connection permission signal 53 to the slave device 20.

When the slave device 20 receives the communication connection permission signal 53 from the master device 10 (S25), the proximity wireless communication is connected between the master device 10 and the slave device. Then, after a next beacon signal 51 is transmitted, the proximity wireless communication is started and a data signal 54 is transmitted and received between the master device 10 and the slave device 20 (S14, S26). In FIG. 4, the data signal 54 is shown which is transmitted from the master device 10 to the slave device 20.

After that, when the slave device 20 decides that the slave device 20 is located outside the proximity wireless communication area in the process for deciding whether the slave device is located inside or outside the proximity wireless communication area (S27), the slave device transmits a communication disconnection request signal 55 to the master device 10. When the master device 10 receives the communication disconnection request signal 55 from the slave device 20 (S15), the master device 10 transmits a communication disconnection permission signal 56 to the slave device 20 (S16). When the slave device 20 receives the communication disconnection permission signal 56 from the master device 10 (S29), the proximity wireless communication is disconnected between the master device 10 and the slave device.

<Beacon Format>

Figure 6:
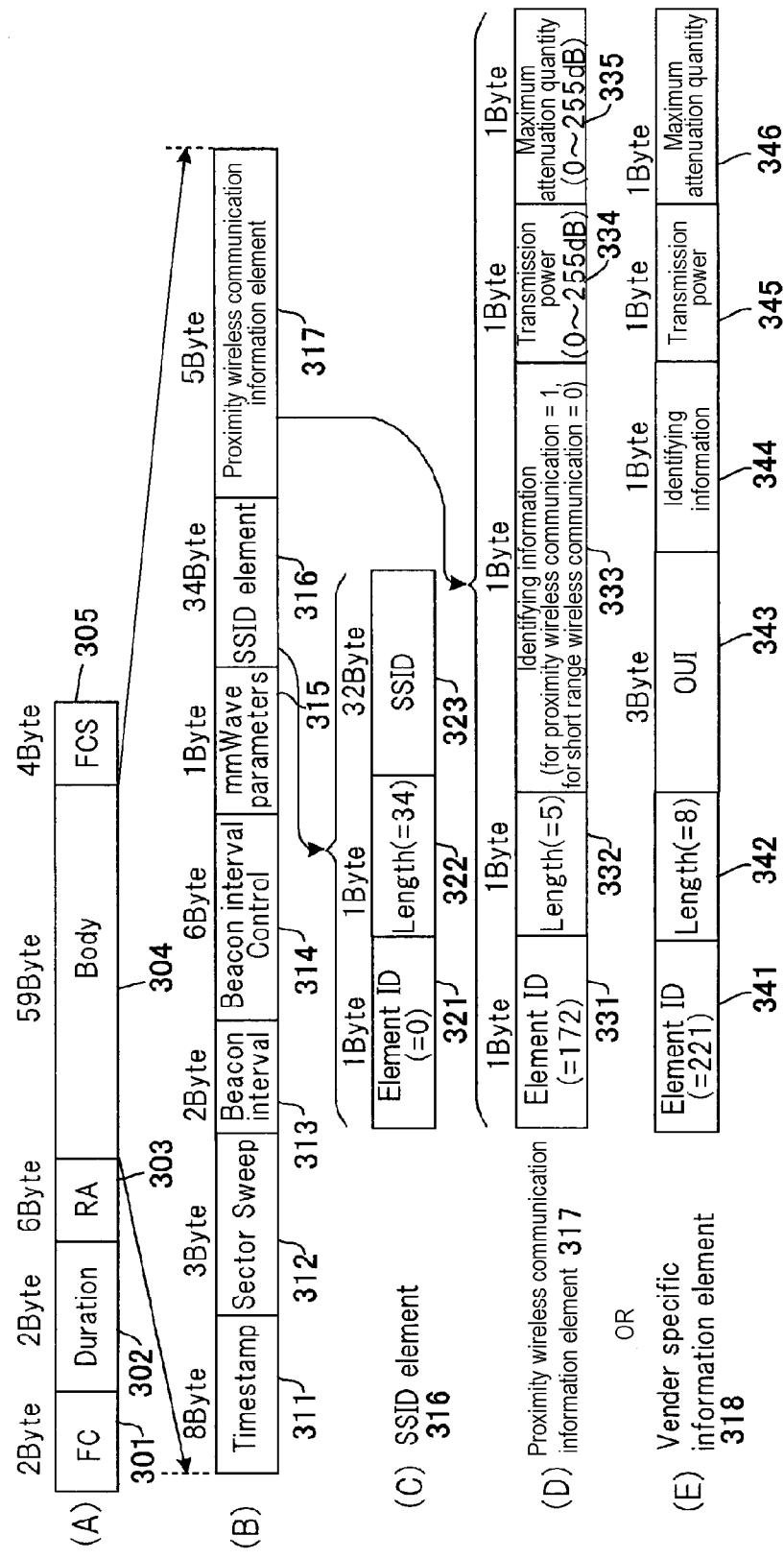
FIG. 6 is a diagram showing an example of a format of a beacon signal used in the wireless communication system of the present embodiment.

One example of the beacon signal 51 is shown. FIG. 6 is a diagram showing an example of a format of the beacon signal used in the wireless communication system according to the present embodiment. An illustrated example shows an example using a beacon frame format based on an IEEE 802.11ad Draft 1.0.

As shown in FIG. 6(A), the beacon signal 51 includes FC (Frame Control) 301, Duration 302, RA 303, Body 304 and FCS (Frame Check Sequence) 305. The FC 301 indicates frame type information and is 0x03 in the case of a frame of a beacon for a milliwave communication. The Duration 302 indicates information showing a remaining time until a beacon transmission period is finished. The Body 303 indicates a main body of beacon information, which will be described below. The RA 304 indicates BSSID of a master station (the master device). The FCS 305 indicates a bit string for inspecting an error of the frame.

As shown in FIG. 6(B), the Body of the beacon signal 51 includes Timestamp 311, Sector Sweep 312, Beacon Interval 313, Beacon Interval Control 314 and mmWave Parameters 315 in the first section. They are information based on the IEEE 802.11ad. The Body of the beacon signal 51 includes a predetermined number of Information Elements (IE). In this example, as the Information Elements, SSID element 316 and proximity wireless communication information element 317 are included.

The SSID element 316 is the IE showing SSID (Service Set Identifier) as identifying information for designating a specific network and predetermined by a wireless LAN standard of IEEE 802.11 series. As shown in FIG. 6(C), the SSID element 316 includes Element ID 321, Length 322 and SSID 323.

The proximity wireless communication information element 317 is the IE showing the beacon signal for the proximity wireless communication and includes information related to the communicable area of the proximity wireless communication. As shown in FIG. 6(D), the proximity wireless communication information element 317 includes Element ID 331, Length 332, identifying information 333, transmission power information 334 and maximum attenuation quantity information 335. In this example, the Element ID is set to 172 and Length is set to 5. The identifying information 333 is set to "1" for the proximity wireless communication and to "0" for the short range wireless communication.

The transmission power information 334 indicates information of one byte that the transmission power of the beacon signal is expressed by 0 to 255 dB. The maximum attenuation quantity information 335 corresponds to the communication distance upper limit information of the proximity wireless communication as one example of the communicable area definition information and is information showing the maximum attenuation quantity of the transmission power in the proximity wireless communication area. The maximum attenuation quantity information 335 indicates information of one byte that the maximum attenuation quantity up to a communication distance upper limit of the proximity wireless communication is expressed by 0 to 255 dB.

Further, as the IE showing the beacon signal for the proximity wireless communication, Vender Specific information element 318 may be used in place of the proximity wireless communication information element 317. The Vender Specific information element 318 is the IE which can be independently used by venders of the wireless communication terminal and the device. As shown in FIG. 6(E), the Vender Specific information element 318 includes Element ID 341, Length 342, OUI (Organizationally Unique Identifier) 343, identifying information 344, transmission power information 345 and maximum attenuation quantity information 346. In this example, the Element ID is set to 221 and the Length is set to 8.

The OUI 343 indicates the first half 24 bit part of a MAC address used in a LAN and identifying information assigned respectively to the venders of the wireless communication terminal and the device. As the identifying information 344, the transmission power information 345 and the maximum attenuation quantity information 346, the same information as that of the above-described proximity wireless communication information element 317 can be used.

<Process for Deciding Whether Slave Device is Located Inside or Outside Proximity Wireless Communication Area>

Figure 7:
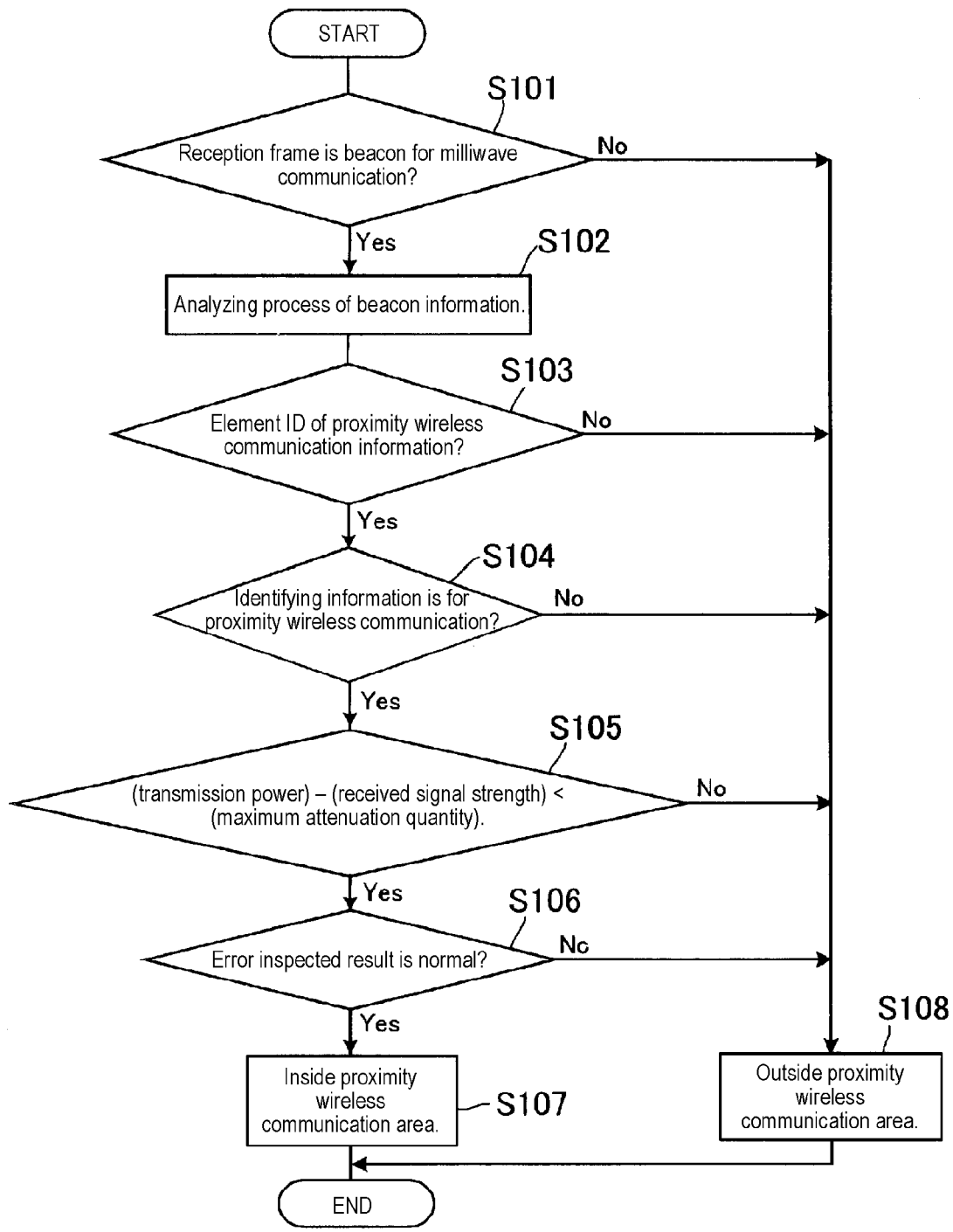
FIG. 7 is a flowchart showing a procedure of a process for deciding whether the slave device is located inside or outside an area of the proximity wireless communication in the slave device of the present embodiment.

Shown is one example of a procedure of a process for deciding whether the slave device is located inside or outside the proximity wireless communication area. FIG. 7 is a flowchart showing the procedure of the process for deciding whether the slave device is located inside or outside the proximity wireless communication area in the slave device 20 of the present embodiment. The procedures respectively described below are mainly performed in the processing section 210 of the slave device 20. FIG. 7 shows an operation when the beacon signal shown in FIG. 6 is received.

When the slave device 20 receives the radio signal, the slave device 20 decides whether or not the reception frame is the beacon signal for the milliwave communication in the processing section 210 (S101). In this case, the processing section 210 refers to the FC 301 of the reception frame, and when the FC is equal to 0x03, the processing section decides that the reception frame is the beacon signal for the milliwave communication. When the reception frame is not the beacon signal for the milliwave communication (S101 No), the processing section 210 decides that the slave device is located outside the proximity wireless communication area (S108) to finish the process.

When the reception frame is the beacon signal for the milliwave communication (S101 Yes), then, the processing section 210 analyzes the information (the beacon information) included in the beacon signal (S102). As an analysis of the beacon information, a frame analyzing process based on the IEEE 802.11ad is performed. Specifically, the Duration 302, the RA 302 and the Timestamp 311, the Sector Sweep 312, the Beacon Interval 313, the Beacon Interval Control 314 and the mmWave Parameters 315 of the Body 304 are analyzed.

Subsequently, the processing section 210 refers to the element ID of the IE to decide whether or not the element ID is the element ID of the proximity wireless communication information element 317 (S103). When the IE is the proximity wireless communication information element 317, the processing section 210 advances to a next process. When the IE is not the proximity wireless communication information element 317, the processing section decides that the slave device is located outside the proximity wireless communication area (S108) to finish the process.

Subsequently, the processing section 210 refers to the identifying information 333 in the proximity wireless communication information element 317 to decide whether or not the identifying information 333 is set for the proximity wireless communication (=1) (S104). When the identifying information 333 is set for the proximity wireless communication, the processing section 210 advances to a next process. When the identifying information 333 is not set for the proximity wireless communication, the processing section decides that the slave device is located outside the proximity wireless communication area (108) to finish the process.

Then, the processing section 210 performs a calculation for deciding whether or not the slave device is located inside or outside the proximity wireless communication area by using the transmission power information 334, the maximum attenuation quantity information 335 and the information of the received signal strength of the received beacon signal (S105). When the processing section 210 subtracts the received signal strength from the transmission power of the beacon signal and compares an obtained result with the maximum attenuation quantity to obtain a relation expressed by (the transmission power)−(the received signal strength)<(the maximum attenuation quantity), the processing section 210 advances to a next process. Otherwise, the processing section 210 decides that the slave device is located outside the proximity wireless communication area (S108) to finish the process.

Then, the processing section 210 performs an error inspecting process by using the FCS 305 to decide whether or not an error inspected result is normal (S106). When the error inspected result is normal, the processing section 210 decides that the slave device is located inside the proximity wireless communication area (S107) to finish the process. When the error inspected result is abnormal, the processing section 210 decides that the slave device is located outside the proximity wireless communication area (S108) to finish the process.

According to the present embodiment, the communicable area can be limited by using a decision of a distance as well as a physical range of a radio wave. Even in the physical range of the radio wave, that is located outside the communicable area, a connection is not performed, so that a wrong transmission can be prevented at the time of the proximity wireless communication. Especially, when the present invention is applied to the ultra high speed wireless communication system, the wireless communication terminal and the wireless communication device which use the milliwave band, a high transmission rate and a high reliability can be compatible and a larger effect can be obtained.

Second Embodiment

A second embodiment shows a method for connecting and disconnecting a communication of a proximity wireless communication and one example of a wireless communication terminal and a wireless communication device using the proximity wireless communication.

In the second embodiment, in order to efficiently connect and disconnect the proximity wireless communication, the wireless communication terminal and the wireless communication device initially connect a communication by a short range wireless communication in a short range wireless communication area (several ten cm to several m or so), and when the wireless communication terminal and the wireless communication device come near to a proximity wireless communication area (several cm or so), they are connected by a proximity wireless communication.

Namely, the wireless communication terminal and the wireless communication device decide whether or not a communication party station is located in the proximity of the proximity wireless communication area by using a signal strength of a received signal by the short distance wireless communication. When the wireless communication terminal and the wireless communication device decide that the communication party station is located in the vicinity of the proximity wireless communication area, the wireless communication terminal and the wireless communication device start a communication connecting operation of the proximity wireless communication and are connected by the proximity wireless communication in the proximity wireless communication area (a communicable area).

As a wireless communication system, a wireless communication system is supposed, like the first embodiment, to perform a communication by the proximity wireless communication between a master device (a wireless communication device A) and a slave device (a wireless communication device B). Here, different points from those of the first embodiment will be mainly described.

Figure 8:
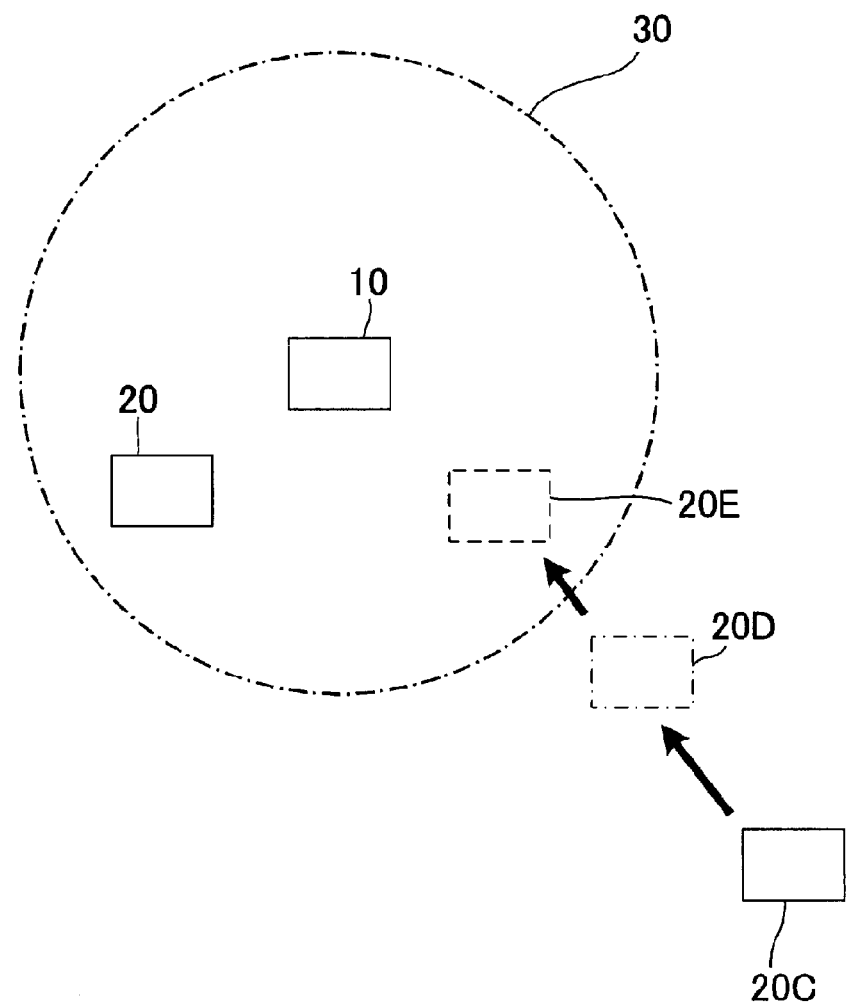
FIG. 8 is a diagram showing a schematic arrangement and structure of a wireless communication system according to a second embodiment.

FIG. 8 is a diagram showing a schematic arrangement and structure of the wireless communication system according to the second embodiment. The master device 10 initially transmits a beacon signal for performing a communication by the short range wireless communication to a peripheral space. A transmission power of the beacon signal is increased so that the beacon signal may reach the short range wireless communication area (the several ten cm to the several m or so) and the beacon signal is transmitted in a long transmission cycle.

The slave device 20 which receives the beacon signal for the short range wireless communication from the master device 10 starts a communication connection to the master device 10 by the short range wireless communication to transmit and receive data. Then, the slave device 20 estimates a distance from the master device 10 by using a received signal strength of the beacon signal for the short range wireless communication, a received signal strength of a data signal or an attenuation quantity of the transmission power.

When the slave device 20 estimates that the distance from the master device is located in the proximity of the proximity wireless communication area, the slave device 20 transmits communication area proximity information to the master device 10. When the master device 10 receives the communication area proximity information from the slave device 20, the master device switches the beacon signal to a beacon signal for the proximity wireless communication and transmits the beacon signal to the peripheral space. A transmission power of the beacon signal is decreased so that a range may exceed the proximity wireless communication area (up to a neighbor) and the beacon signal is transmitted in a short transmission cycle.

The slave device 20 which receives the beacon signal for the proximity wireless communication decides whether the slave device 20 is located inside or outside the proximity wireless communication area as in the first embodiment. When the slave device 20 decides that the slave device 20 is located inside the proximity wireless communication area, the slave device 20 is connected to the master device 10 to transmit and receive data by the proximity wireless communication.

Namely, the master device 10 transmits the beacon signal for the short range wireless communication and the slave device is connected to communicate with the master device 10 initially by the short range wireless communication outside the area (20C) of the proximity wireless communication area 30 like the slave devices 20C, 20D and 20E. Then, when the slave device moves to come to the proximity (20D) of the proximity wireless communication area 30, the master device 10 switches the beacon signal to the beacon signal for the proximity wireless communication. When the slave device enters inside the area (20E) from the proximity of the area, the slave device starts to a communication connection to the master device 10.

<Operation of Wireless Communication System>

Figure 9:
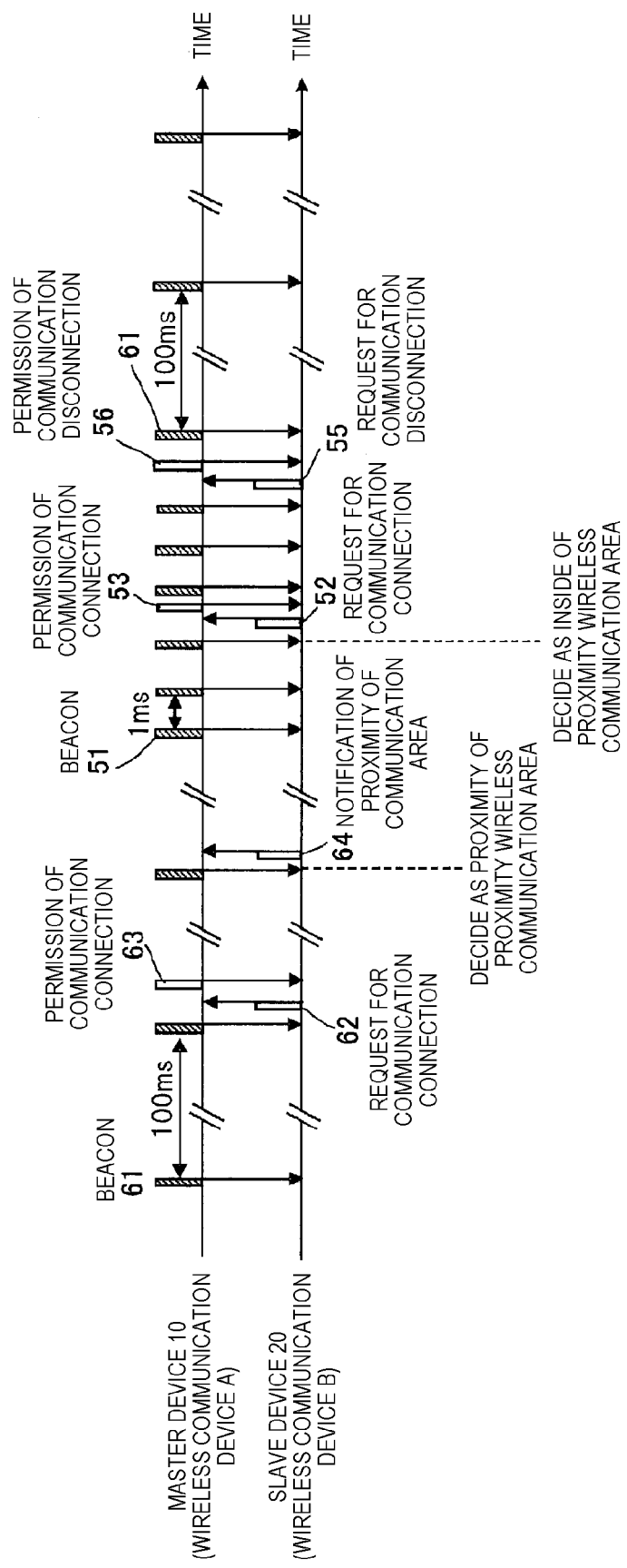
FIG. 9 is an explanatory view of an operation showing operations at the time of starting and finishing a proximity wireless communication in the second embodiment.

Now, operations of the master device 10 and the slave device 20 in the wireless communication system of the second embodiment will be described below. FIG. 9 is an explanatory view of an operation showing operations at the time of starting and finishing the proximity wireless communication in the second embodiment. In FIG. 9, a horizontal axis indicates a time and shows a signal transmitted and received between the master device 10 and the slave device 20. Here, a communication signal including the beacon signal transmitted and received between the devices is supposed to be transmitted as a packet. Further, FIG. 10 is a sequence diagram showing processes of the master device 10 and the slave device 20 until the proximity wireless communication is started in the second embodiment.

The master device 10 (the wireless communication device A) periodically transmits the beacon signal 61 used for a communication by the short range wireless communication (S31). The master device 10 generates the beacon signal 61 for the short range wireless communication including short range and proximity wireless communication information related to the short range wireless communication and the proximity wireless communication. The master device 10 transmits the beacon signal 61 at predetermined cycles (for instance, 100 ms) longer than the beacon signal for the proximity wireless communication.

Figure 10:
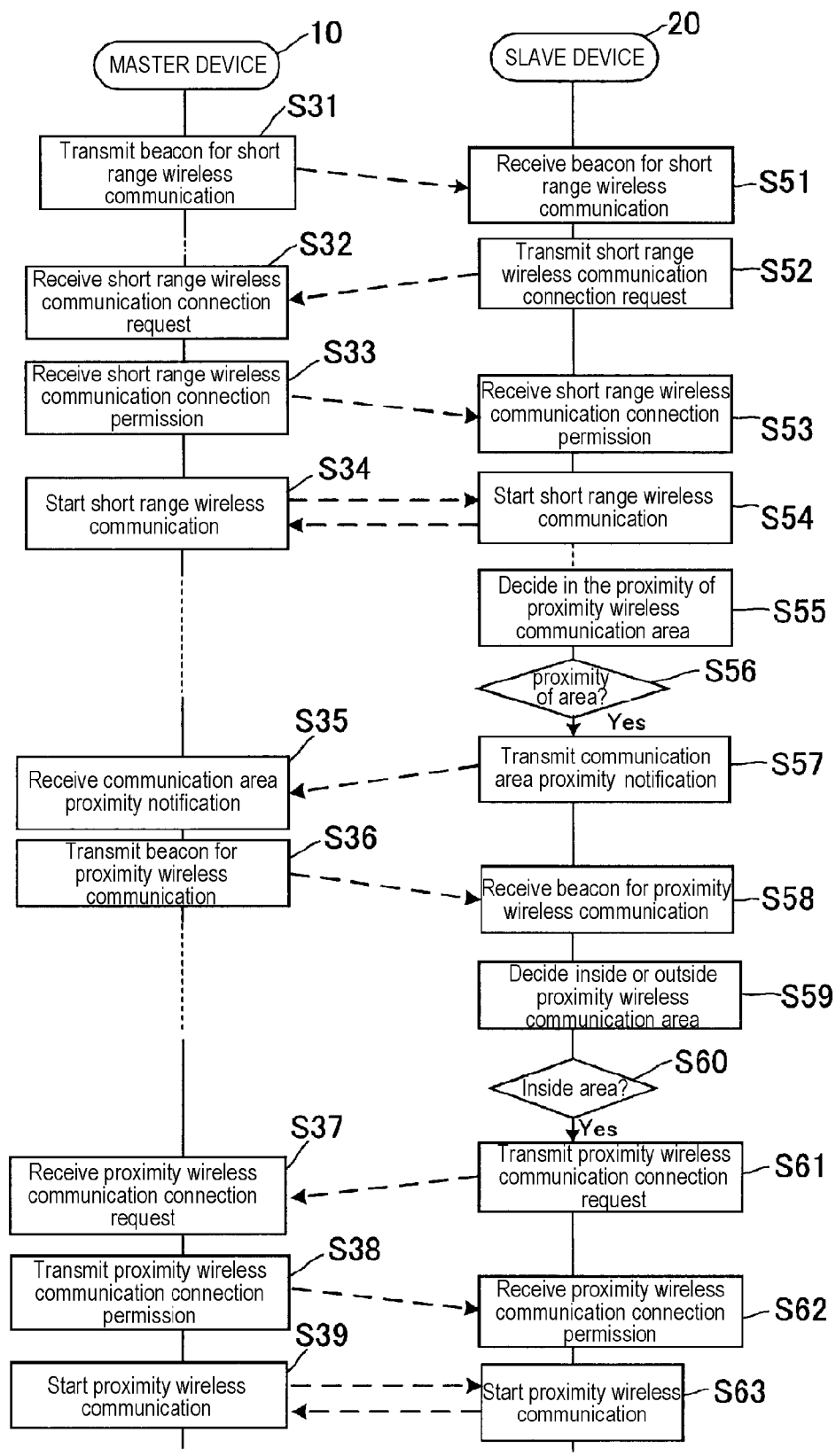
FIG. 10 is a sequence diagram showing processes of a master device and a slave device until the start of the proximity wireless communication in the second embodiment.

Namely, a beacon transmitting process S31 for the short range wireless communication in FIG. 10 is periodically performed. The short range and proximity wireless communication information included in the beacon signal 61 includes at least one or more of identifying information for the short range wireless communication, transmission power information and communicable area definition information (about several ten cm to several m) related to the short range wireless communication. As the communicable area definition information, for instance, dimension information that defines the dimension of the short range wireless communication area and communication distance upper limit information of the short range wireless communication or the like may be used. As the communication distance upper limit information of the short range wireless communication, for instance, a maximum attenuation quantity of the transmission power in the short range wireless communication area may be employed.

The transmission power of the beacon signal 61 is set to a relatively large value so that the range of the beacon signal 61 may cover an inside of the short range wireless communication area (about several ten cm to several m).

When the slave device 20 (the wireless communication device B) receives the beacon signal 61 (S51), the slave device 20 transmits a communication connection request signal 62 as a connection request for the short range wireless communication to the master device 10 (S52). When the master device 10 receives the communication connection request signal 62 from the slave device 20 (S32), the master device 10 transmits a communication connection permission signal 63 as a connection permission of the short range wireless communication to the slave device 20 (S33).

When the slave device 20 receives the communication connection permission signal 63 from the master device 10 (S53), the short range wireless communication is connected between the master device 10 and the slave device. Then, after a next beacon signal 61 is transmitted, the short range wireless communication is started and a data signal is transmitted and received between the master device 10 and the slave device 20 (S34, S54). As a procedure of a communication connection to the short range wireless communication, the same connection sequence as that of a known wireless LAN may be used.

Then, the slave device 20 estimates a distance from the master device 10 as a communication party by the received signal strength of the beacon signal 61 for the short range wireless communication or the received signal strength of the data signal transmitted and received by using the short range wireless communication to decide whether or not the slave device is located in the vicinity of the proximity wireless communication area (S55). A process for deciding whether or not the slave device is located in the proximity of the proximity wireless communication area can be performed by the same procedure as that of the process for deciding whether the slave device is located inside or outside the proximity wireless communication area in the first embodiment.

When the slave device 20 decides that the slave device is located in the vicinity of the proximity wireless communication area in the process for deciding whether or not the slave device is located in the vicinity of the proximity wireless communication area (S56), the slave device 20 transmits a communication area proximity information signal 64 to the master device 10 (S57). When the master device 10 receives the communication area proximity information signal 64 from the slave device 20 (S35), the master device 10 periodically transmits the beacon signal 51 for performing a communication by the proximity wireless communication (S36). The master device 10 switches appended information, the transmission power and a transmission cycle of the beacon signal for the short range wireless communication to those for the proximity wireless communication.

The master device 10 generates the beacon signal 51 for the proximity wireless communication including the proximity wireless communication information related to the proximity wireless communication like the first embodiment. The master device 10 periodically transmits the beacon signal 51 at predetermined short cycles (for instance, 1 ms). Namely, the transmitting process S36 of the beacon for the proximity wireless communication in FIG. 10 is periodically performed.

Proximity wireless communication information included in the beacon signal 51 includes at least one or more of identifying information for the proximity wireless communication, transmission power information and communicable area definition information (about several cm). A transmission power of the beacon signal 51 is set substantially to a level in which a range of the beacon signal 51 exceeds the proximity wireless communication area (about several cm). For instance, the transmission power is set to a value smaller than that for the short range wireless communication by considering a consumed electric power. A below described communication connecting procedure of the proximity wireless communication is the same as that of the first embodiment.

When the slave device 20 receives the beacon signal 51 (S58), the slave device 20 estimates a distance from the master device 10 by using the proximity wireless communication information and information of the received signal strength of the beacon signal 51 to decide whether the slave device is located inside or outside the proximity wireless communication area (S59). A process for deciding whether the slave device is located in side or outside the proximity wireless communication area can be performed by the same procedure as that of the first embodiment.

When the slave device 20 decides that the slave device 20 is located inside the proximity wireless communication area in the process for deciding whether the slave device is located inside or outside the proximity wireless communication area (S60), the slave device 20 transmits a communication connection request signal 52 as a connection request for the proximity wireless communication to the master device 10 (S61).

When the master device 10 receives the communication connection request signal 52 from the slave device 20 (S37), the master device 10 transmits a communication connection permission signal 53 as a connection permission of the proximity wireless communication to the slave device (S38). When the master device 10 estimates the distance to the slave device 20 and the slave device is located within the proximity wireless communication area, the master device 10 may transmit the communication connection permission signal 53, or the master device 10 may omit a deciding process in the proximity wireless communication area to transmit the communication connection permission signal 53 to the slave device.

When the slave device 20 receives the communication connection permission signal 53 from the master device 10

(S62), the proximity wireless communication is connected between the master device 10 and the slave device. Then, after a next beacon signal 51 is transmitted, the proximity wireless communication is started and a data signal is transmitted and received between the master device 10 and the slave device 20 (S39, S63).

After that, when the slave device 20 decides that the slave device is located outside the proximity wireless communication area, the slave device 20 transmits a communication disconnection request signal 55 as a disconnection request for the proximity wireless communication to the master device 10. When the master device 10 receives the communication disconnection request signal 55 from the slave device 20, the master device 10 transmits a communication disconnection permission signal 56 as a disconnection permission of the proximity wireless communication to the slave device 20. When the slave device 20 receives the communication disconnection permission signal 56 from the master device 10, the proximity wireless communication is disconnected between the master device 10 and the slave device.

After the proximity wireless communication is finished, the master device 10 periodically transmits the beacon signal 61 for the short range wireless communication. The master device 10 switches the appended information, the transmission power and the transmission cycle of the beacon signal for the proximity wireless communication to those for the short range wireless communication. For instance, the identifying information for the proximity wireless communication is switched to the identifying information for the short range wireless communication. The large transmission power is switched to the small transmission power. The transmission cycle 1 ms is switched to the transmission cycle 100 ms.

According to the present embodiment, the communicable area can be limited by using a decision of the distance as well as a physical range of a radio wave. Even in the physical range of the radio wave, that is located outside the communicable area, a connection is not performed, so that a wrong transmission can be prevented at the time of the proximity wireless communication.

When the master device 10 is connected once to the slave device 20 by using the short range wireless communication, and then, the slave device 20 is located in the vicinity of the communicable area of the proximity wireless communication, the master device 10 switches the beacon signal for the short range wireless communication to the beacon signal for the proximity wireless communication and is connected to the slave device 20 by using the proximity wireless communication. Thus, an efficient communication connection and communication disconnection can be performed.

Accordingly, a power for the communication connection can be saved and the communication connection and the communication disconnection can be performed in a short time. Further, even when the proximity wireless communication and the short range wireless communication are used at the same time, a wrong communication can be prevented and a reliability of the communication can be ensured. Especially, when the present invention is applied to the ultra high speed wireless communication system, the wireless communication terminal and the wireless communication device which use a milliwave band, a high transmission rate and a high reliability can be compatible and a larger effect can be obtained.

Applied Example

Figure 11:
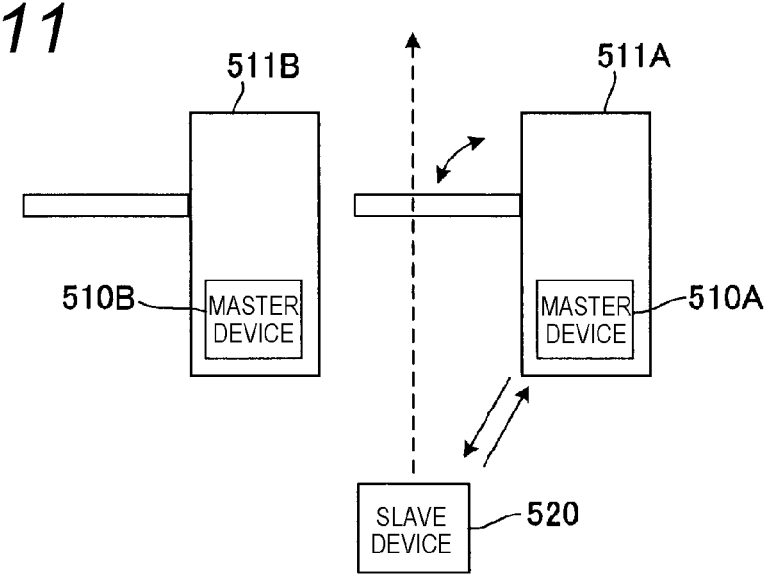
FIG. 11 is a diagram showing a first applied example of the wireless communication system of the present embodiment.

FIG. 11 is a diagram showing a first applied example of the wireless communication system of the present embodiment. The first applied example shows an example in which the wireless communication system of the present embodiments is applied to a wicket of a railway station or a register of a shop. FIG. 11 shows an example of the wicket.

Master devices 510A and 510B are respectively installed in wickets 511A and 511B. The master device 510A performs a proximity wireless communication with a slave device 520 in a proximity wireless communication area while the slave device 520 carried by a user passes the wicket to transmit and receive information related to the wicket. In this case, the master device 510A performs a certification of the user, a check of ticket information or season ticket information, a settlement process of a charge, a payment process and a distribution of various kinds of information. When the wireless communication system is applied to the register of the shop, the master device performs a certification of a user, a settlement process of a charge, a payment process and a distribution of various kinds of information.

When the wireless communication system of the present embodiment is applied, even if other master device 510B coexists in a neighboring place, a communicable area can be limited and it can be properly decided whether the slave device is located inside or outside the communicable area. Thus, an erroneous connection to other wireless communication device can be prevented. Further, the proximity wireless communication can be properly connected and disconnected in a short time between the master device 510A and the slave device 520.

Figure 12:
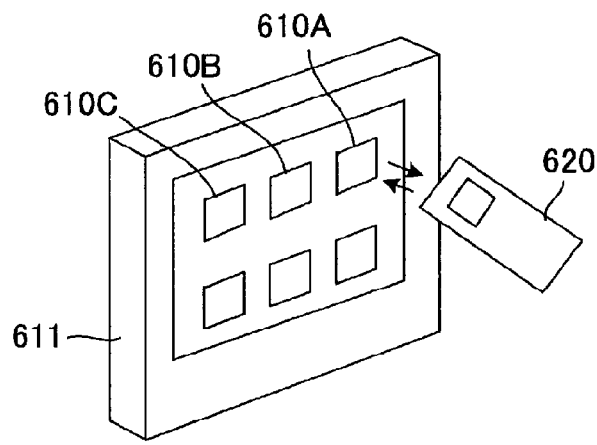
FIG. 12 is a diagram showing a second applied example of the wireless communication system of the present embodiment.

FIG. 12 is a diagram showing a second applied example of the wireless communication system according to the present embodiments. The second applied example shows an example in which the wireless communication system of the present embodiments is applied to a download system of digital contents.

A content download device 611 is installed in a public area so that a user downloads and obtains desired digital contents. The content download device 611 displays a plurality of digital contents so as to be selected by the user. A plurality of master devices 610A, 601B and 610C are provided correspondingly to kinds of the digital contents. A coordinate relation of the master device and the digital contents is arbitrarily set on a one-to-one basis or a one-to-others basis.

When a slave device 620 held by the user comes close to the master device 610A, the master device 610A performs a proximity wireless communication with the slave device 620 in a proximity wireless communication area to transmit and receive information related to the download of the digital contents. In this case, the master device 610A performs a certification of the user, a download process of the digital contents, a settlement process of a charge, a payment process and a distribution of various kinds of information.

When the wireless communication system of the present embodiments is applied, even if other master devices 610B and 610C coexist in neighboring places, a communicable area can be limited and it can be properly decided whether the slave device is located inside or outside the communicable area. Thus, the proximity wireless communication with the master device 610A to which the user of the slave device 620 is allowed to selectively come close can be normally performed and a reliability of communication can be improved.

Figure 13:
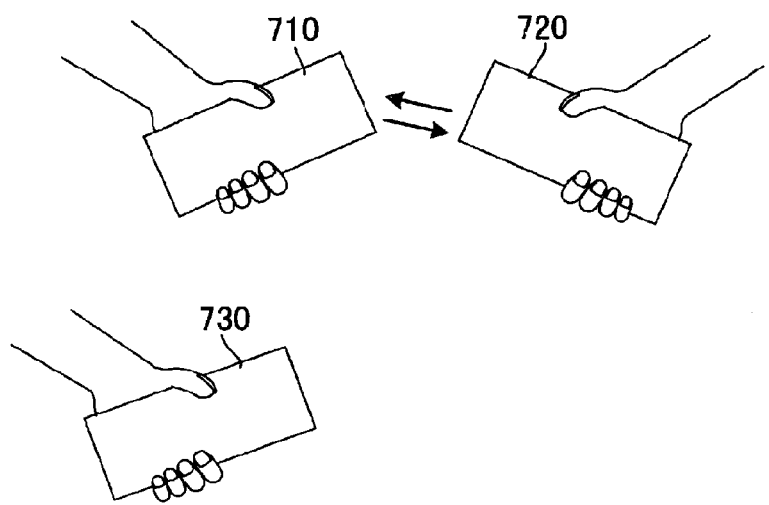
FIG. 13 is a diagram showing a third applied example of the wireless communication system of the present embodiment.

FIG. 13 is a diagram showing a third applied example of the wireless communication system according to the present embodiments. The third applied example shows an example in which the wireless communication system of the present embodiments is applied when a communication such as an exchange of files and an exchange of information is performed between wireless communication terminals.

In the above-described embodiments, the wireless communication device is mainly described as the master device and the wireless communication terminal as the slave device. Alternatively, the wireless communication device or the wireless communication terminal may include the master device and the slave device.

In the wireless communication device or the wireless communication terminal, the roles of the master device and slave device may be switched and used depending on a communicating party.

Accordingly, the master device is not limited to a fixed device as shown in FIGS. 11 and 12 and the master device may be a mobile wireless communication device or a wireless communication terminal as shown in FIG. 13.

A wireless communication terminal 710 and a wireless communication terminal 720 are allowed to come close to each other so that both the wireless communication terminals can perform a proximity wireless communication in a proximity wireless communication area. In this case, one serves as the master device and the other serves as the slave device to perform the proximity wireless communication and a communication on a one-to-one basis such as an exchange of files of digital contents and an exchange of personal information. In the proximity wireless communication, may be performed a communication between a plurality of devices such as a communication on a one-to-others basis.

When the wireless communication system of the present embodiments is applied, even if other wireless communication terminal 730 is present in neighboring place, a communicable area can be limited and it can be properly decided whether the slave device is located inside or outside the communicable area. Thus, a communication and a connection can be normally performed between the wireless communication terminal 710 and the wireless communication terminal 720 which are suitable for the proximity wireless communication and a reliability of communication can be improved.

In the present invention, it is to be understood and included within a scope to be protected that a person with ordinary skill in the art may make various changes and applications in accordance with the description of the specification and the known technique without departing from the gist and scope of the present invention.

Further, component elements in the above-described embodiments may be arbitrarily combined together within a range that does not deviate from the gist of the present invention.

In the above-described embodiment, the structures using hardware are described as the examples. However, the present invention may be realized by software.

Further, the functional blocks used for explaining the embodiments are respectively typically realized by an LSI as an integrated circuit. These functional blocks may be individually formed as one chips respectively or may be formed as one chip so as to include a part or all parts. Here, the functional block is realized as the LSI, however, the functional block may be possibly called an IC, a system LSI, a super LSI and a ultra LSI depending on the difference of degree of integration.

Further, a method for forming the integrated circuit is not limited to the LSI and may be realized by using a special purpose circuit or a general purpose processor. After the LSI is produced, may be used a programmable FPGA (Field Programmable Gate Array) or a reconfigurable processor which can reconfigure a connection and setting of a circuit cell in the LSI.

Further, if an integrated circuit technology appears with which the LSI is replaced in accordance with a progress of a semiconductor technology or another derived technology, the functional blocks may be naturally integrated by using the technique. A biological technology may be possibly adapted.

The present application is based on Japanese Patent Application No. 2011-027720 filed on Feb. 10, 2011, the contents of which are incorporated herein as a reference.

INDUSTRIAL APPLICABILITY

The present invention can effectively limit a communicable area properly in a proximity wireless communication and prevent a wrong communication, and is available as a wireless communication terminal, a wireless communication device and a wireless communication method which can perform a proximity wireless communication using, for instance, a milliwave band.

REFERENCE SIGNS LIST

10: Master device
20, 20A, 20B, 20C, 20D, 20E: Slave device
30: Proximity wireless communication area
101: Antenna
102: Milliwave radio frequency section
103: Frame transmitter
104: Milliwave modulator
105: Milliwave demodulator
106: Frame receiver
107: Memory
108: Transmission power controller
109: Timer
110: Processing section
111: Communicable area deciding section
112: Connection controller
113: Beacon generator
201: Antenna
202: Milliwave radio frequency section
203: Frame transmitter
204: Milliwave modulator
205: Milliwave demodulator
206: Frame receiver
207: Memory
208: Reception power measuring section
209: Timer
210: Processing section
211: Communicable area deciding section
212: Connection controller

The invention claimed is:

1. A wireless communication terminal, comprising:
a beacon receiver configured to, in operation, receive a first beacon signal transmitted from a communication party device by a proximity wireless communication, the first beacon signal including information related to a communicable area of the proximity wireless communication;
a communicable area deciding section configured to, in operation decide a position of the wireless communication terminal by using the first beacon signal; and
a connection controller configured to, in operation use a decided result of the communicable area deciding section, and does not connect the wireless communication terminal to the communication party device using the proximity wireless communication when the beacon receiver receives the first beacon signal and the communicable area deciding section decides that the position of the wireless communication terminal is located outside the communicable area of the proximity wireless communication, and connects the wireless communication terminal to the communication party device using the proximity wireless communication when the beacon receiver receives the first beacon signal and the communicable area deciding section decides that the position of the wireless communication terminal is located inside the communicable area of the proximity wireless communication; wherein the beacon receiver configured to, in operation, further receive a second beacon signal transmitted from the communication party device by a short range wireless communication having a communicable area of the short range wireless communication which is wider than the communicable area of the proximity wireless communication, the communicable area deciding section configured to, in operation, decide the position of the wireless communication terminal by further using the second beacon signal, the connection controller configured to, in operation, connect the wireless communication terminal to the communication party device by using the short range wireless communication when the position of the wireless communication terminal is located inside the communicable area of the short range wireless communication and outside the communicable area of the proximity wireless communication in accordance with a decided result of the communicable area deciding section, the second beacon signal includes identifying information for the short range wireless communication, the first beacon signal includes identifying information for the proximity wireless communication, and the first beacon signal has a smaller transmission power and a shorter transmission cycle than those of the second beacon signal.

2. The wireless communication terminal according to claim 1, wherein
the communicable area of the proximity wireless communication is an area narrower than an area where the first beacon signal can be received.

3. The wireless communication terminal according to claim 1, wherein
when the beacon receiver receives the first beacon signal and the communicable area deciding section decides that the position of the wireless communication terminal is located within the communicable area of the proximity wireless communication, the connection controller outputs a proximity wireless communication connection request signal to the communication party device.

4. The wireless communication terminal according to claim 1, wherein
the beacon signal includes transmission power information and communicable area definition information of the beacon signal as the information related to the communicable area, and
the communicable area deciding section configured to, in operation, estimate the distance to the communication party device and decide whether the position of the wireless communication terminal is located inside or outside the communicable area by using received signal strength information of the beacon signal, the transmission power information and the communicable area definition information.

5. The wireless communication terminal according to claim 1, wherein
when the position of the wireless communication terminal is located in the proximity of an outside of the communicable area in accordance with the decided result of the communicable area proximity deciding section using the second beacon signal, the connection controller informs the communication party device of a transmission request signal for the first beacon signal.

6. A wireless communication device, comprising:
a beacon generator configured to, in operation, generate a first beacon signal including information related to a communicable area of a proximity wireless communication;
a beacon transmitter configured to, in operation, transmit the first beacon signal in a first cycle by using a transmission power which reaches beyond the communicable area;
a signal receiver configured to, in operation, receive a proximity wireless communication connection request signal for requesting a connection of the proximity wireless communication from a communication party terminal which has received the first beacon signal; and
a connection controller configured to, in operation, use the proximity wireless communication connection request signal, and does not connect the communication party terminal using the proximity wireless communication to the wireless communication device when the communication party terminal receives the first beacon signal and, a position of the communication party terminal is located outside the communicable area of the proximity wireless communication, and connects the communication party terminal to the wireless communication device when the communication party terminal receives the first beacon signal and the position of the communication party terminal is located inside the communicable area of the proximity wireless communication; wherein
the beacon generator configured to, in operation, further generate a second beacon signal for a short range wireless communication having a communicable area of the short range wireless communication which is wider than the communicable area of the proximity wireless communication,
the beacon transmitter configured to, in operation, further transmit the second beacon signal in a second cycle,
the first beacon signal is transmitted when a transmission request signal for the first beacon signal is received from the communication party terminal which has received the second beacon signal,
the second beacon signal includes identifying information for the short range wireless communication,
the first beacon signal includes identifying information for the proximity wireless communication, and
the beacon transmitter transmits the first beacon signal by using a smaller transmission power and a shorter transmission cycle than those of the second beacon signal.

7. The wireless communication device according to claim 6, wherein
the beacon generator configured to, in operation, generate the first beacon signal including transmission power information and communicable area definition information of the first beacon signal as the information related to the communicable area.

8. The wireless communication device according to claim 6, further comprising
a communicable area deciding section configured to, in operation, estimate a distance to the communication party terminal by using the proximity wireless communication connection request signal and outputs position information of the communication party terminal.

9. A wireless communication method in a wireless communication terminal capable of performing a proximity wireless communication and a short range wireless communication having a communicable area wider than that of the proximity wireless communication, the wireless communication method comprising:
   a step of receiving a second beacon signal for the short range wireless communication;
   a step of connecting the wireless communication terminal to a communication party device which has transmitted the second beacon signal by using the short range wireless communication in accordance with a reception of the second beacon signal;
   a step of deciding a position of the wireless communication terminal by using the second beacon signal or a communication signal of the short range wireless communication as a second decided result;
   a step of informing the communication party device of a transmission request signal for a first beacon signal when the second decided result indicates the position of the wireless communication terminal is located in a proximity of the communicable area;
   a step of receiving the first beacon signal for the proximity wireless communication transmitted from the communication party device, the first beacon signal including information related to the communicable area of the proximity wireless communication;
   a step of deciding the position of the wireless communication terminal by using the first beacon signal as a first decided result; and
   a step of using the first decided result of the position of the wireless communication terminal, and not connecting the wireless communication terminal to the communication party device using the proximity wireless communication when the wireless communication terminal receives the first beacon signal and, the first decided result indicates the position of the wireless communication terminal is located outside the communicable area of the proximity wireless communication, and connecting the wireless communication terminal to the communication party device by using the proximity wireless communication when the wireless communication terminal receives the first beacon signal and the first decided result indicates the position of the wireless communication terminal is located inside the communicable area of the proximity wireless communication.

10. A wireless communication method in a wireless communication device capable of performing a proximity wireless communication and a short range wireless communication having a communicable area wider than that of the proximity wireless communication, the wireless communication method comprising:
   a step of generating a second beacon signal for the short range wireless communication;
   a step of transmitting the second bacon signal in a second cycle;
   a step of connecting a communication party terminal which has received the second beacon signal by using the short range wireless communication;
   a step of generating a first beacon signal including information related to the communicable area of the proximity wireless communication;
   a step of transmitting the first beacon signal in a first cycle when a transmission request signal for the first beacon signal is received from the communication party terminal which has received the second beacon signal;
   a step of receiving a proximity wireless communication connection request signal for requesting for a connection to the proximity wireless communication from the communication party terminal which has received the first beacon signal; and
   a step of using the proximity wireless communication connection request signal, not connecting the communication party terminal using the proximity wireless communication to the wireless communication device when the communication party terminal can receive the first beacon signal, but a position of the communication party terminal is located outside the communicable area of the proximity wireless communication, and connecting the communication party terminal to the wireless communication device by using the proximity wireless communication when the communication party terminal can receive the first beacon signal and the position of the communication party terminal is located inside the communicable area of the proximity wireless communication.

* * * * *